United States Patent
Skinner et al.

(10) Patent No.: US 7,105,120 B2
(45) Date of Patent: Sep. 12, 2006

(54) MOULDING METHODS

(76) Inventors: Lee Martin Skinner, 132 Balgores Lane, Romford, Essex RM2 5JX (GB); Graham Frank Towers, 24 High Street, Ringstead, Kettering, Northamptonshire NN14 4DA (GB); Ajay Talwar, C-43, Kirti Nagar, New Delhi 110015 (IN)

( * ) Notice: Subject to any disclaimer, the term of this patent is extended or adjusted under 35 U.S.C. 154(b) by 47 days.

(21) Appl. No.: 10/344,967

(22) PCT Filed: Aug. 20, 2001

(86) PCT No.: PCT/GB01/03703

§ 371 (c)(1),
(2), (4) Date: Sep. 23, 2003

(87) PCT Pub. No.: WO02/16115

PCT Pub. Date: Feb. 28, 2002

(65) Prior Publication Data

US 2004/0130067 A1    Jul. 8, 2004

(30) Foreign Application Priority Data

Aug. 18, 2000    (GB) .................................. 0020355.4

(51) Int. Cl.
*B29C 39/10*    (2006.01)
*B29C 70/02*    (2006.01)

(52) U.S. Cl. ................ 264/257; 264/261; 264/267; 264/279

(58) Field of Classification Search ................ 264/255, 264/257, 258, 261, 267, 268, 273, 274, 275, 264/277, 279, 319, 333

See application file for complete search history.

(56) References Cited

U.S. PATENT DOCUMENTS

| | | | | |
|---|---|---|---|---|
| 3,839,521 A | * | 10/1974 | Robinson | 264/87 |
| 4,025,686 A | * | 5/1977 | Zion | 442/373 |
| 4,933,131 A | * | 6/1990 | Okey et al. | 264/255 |
| 5,242,637 A | * | 9/1993 | Inoue et al. | 264/45.3 |
| 5,268,226 A | * | 12/1993 | Sweeney | 428/312.4 |
| 5,296,187 A | * | 3/1994 | Hackman | 264/257 |
| 5,308,572 A | * | 5/1994 | Hackman | 264/510 |
| 5,672,309 A | * | 9/1997 | Masui et al. | 264/257 |
| 6,627,018 B1 | * | 9/2003 | O'Neill et al. | 156/78 |

* cited by examiner

*Primary Examiner*—Angela Ortiz
(74) *Attorney, Agent, or Firm*—Renner, Kenner, Greive, Bobak, Taylor & Weber

(57) ABSTRACT

A method of molding a high density composite article which, when completed, has opposed outer skins of fiber-reinforced plastics material and polymer mortar core between the skins. The method is performed by (a) providing an openable mold defining a mold cavity and an injection port through which polymer mortar may be introduced into the cavity; (b) opening the mold and placing within the cavity respective layers of fiber reinforcement to form the opposed outer skins; (c) closing the mold and injecting polymer mortar consisting of a resinous material loaded with high density particulate aggregate through the injection port into the cavity, between the layers of fiber reinforcement placed therein; and (d) applying sufficient pressure to the injected polymer mortar to ensure resin is separated from the polymer mortar and penetrates the said layers. The mesh size of the layers of fibrous reinforcing material is on average less than the average size of the high density particulate aggregate whereby the reinforcing material filters aggregate from the resin penetrating said layers, so that the aggregate stays within the polymer mortar core and high fiber/resin ratios are achieved in the skins.

17 Claims, 2 Drawing Sheets

MOULDING METHODS

This invention relates to a method of moulding a composite article which has spaced fibre-reinforced plastics skins.

There are many different techniques for the manufacture of fibre reinforced plastics (FRP) articles and these give varying mechanical and physical characteristics. The traditional approach to the manufacture of FRP articles is by a hand lay-up process, where layers of fibre reinforcement are built up within or around a mould, each layer being impregnated with plastics resin as the process continues until the required thickness is obtained. Very often, a gel coat layer of a suitable plastics material is applied to the mould as an initial step, whereafter the layers of fibre reinforcement, usually in mat form, are built up on the gel coat. This process has many advantages such as low tooling costs, and it therefore is suited to the manufacture of single articles or low number production batches.

When manufacturing a FRP article, it is possible to align the reinforcement fibres to provide either uni-directional or biased reinforcement levels in a single direction. This makes the process particularly suitable for the manufacture of various articles which are stressed in use in one direction more than another direction. For example, the process may be used for the manufacture of pipes, segments of pipes or spanning structural elements.

A disadvantage of the hand lay-up process is that the quality of the ultimate product is highly dependent upon the operator skill. As such, it is difficult to ensure quality control, and consequently mechanical properties can vary greatly over a production batch. Further, though the aim is to have each layer of reinforcement fully "wetted" with the resin, it is very difficult to achieve this manually, and consequently only a relatively low fibre/resin ratio can be achieved. A further problem with a hand lay-up process is the low fibre/resin entrapment of air pockets in the layers, which serve to reduce the strength of the ultimate product.

Composite articles, manufactured to have two spaced skins of FRP with a core therebetween, are used in various industries. For example, it is known to manufacture building components, pipes and pipe segments in this way, using a polymer mortar matrix core. The polymer mortar matrix core comprises a resinous material loaded with a filler, serving as a resin extender, or with an aggregate, serving both to bulk the resin and modify the mechanical properties of the cured resin system. Both fillers and aggregates can be used in the matrix and have densities greater than that of the resinous material contained within the polymer mortar matrix. The use of a filler, an aggregate or both a filler and an aggregate can significantly reduce the cost of a composite FRP product, while allowing good mechanical properties to be achieved. The outer skins can be designed to enhance the strength of a composite product, since those skins will be subjected to the greatest stress under loading conditions.

If such composite articles are manufactured by manual processes, dimensional control is very difficult, and the core must be allowed to cure sufficiently before the second skin of FRP layers can be applied. This protracts the manufacturing process and can reduce the homogeneity of the final product. Also, in the case of use of aggregate, in view of the disparity between the density of the resin and that of the aggregate, there is a tendency for the aggregate to drift under gravity through the resin before the resin cures sufficiently, so leading to variations in the core properties within one article.

Other known processes for the manufacture of composite FRP articles include resin transfer moulding and compression moulding. Extremely good mechanical properties can be obtained by the latter process but it is very expensive to operate and in view of the high tooling cost, suitable only for long production runs. Resin transfer moulding can be used with relatively low batch runs and produces better products than by hand lay-up processes, but it is difficult to produce large or thick laminates by this process. It is also difficult to achieve high fibre/resin ratios and without the ability to achieve high levels of filler, only relatively low stiffness can be obtained.

Manufacturing processes for lightweight sandwich-type composites are also well known. These processes use a syntactic foam or traditional blown-foamed core, either injected or pre-formed, that are combined with outer fibre reinforced layers or pre-formed skins to produce lightweight composites. These known processes, described for example in U.S. Pat. No. 4,025,686-A, are suitable for use only with low density fillers, such as hollow microspheres of glass, epoxy or phenolic materials into the fluid resins (with additives and curing agents) to form a mouldable, curable, lightweight syntactic foam core between the reinforced skins. For many light-weight composites, air entrapment within the structure may be acceptable or even desirable (in the case of simple foam cores), so further reducing the overall weight of the moulded article, but this is not the case for dense high-strength composites intended to be used in building and other rigorous structural applications where maximum strength and stiffness is sought. Rather, air entrapment must be avoided to ensure the highest possible wetting of the outer layers with resin and the densest possible core structure.

The present invention aims at addressing the disadvantages associated with the above-discussed known processes for producing composite articles, thereby to permit the manufacture of relatively strong and dense composite articles in a simple, relatively cheap and effective manner which nevertheless gives high quality products having good dimensional tolerances, homogeneity and high strengths.

According to the present invention, there is provided a method of moulding a composite article to have opposed outer skins of fibre-reinforced plastics material and a polymer mortar core therebetween, comprising the steps of:

providing an openable mould defining a mould cavity and an injection port through which a polymer mortar matrix may be introduced into the cavity;

opening the mould and placing within the cavity respective layers of fibre reinforcement to form said opposed outer skins;

closing the mould and injecting polymer mortar matrix through the injection port into the cavity, between the layers of fibre reinforcement placed therein; and applying sufficient pressure to the injected polymer mortar matrix to ensure resin penetration of said layers;

in which method the injected polymer mortar matrix comprises a resinous material loaded with a particulate aggregate the density of which is greater than that of the resinous material contained within the polymer mortar matrix, and the mesh of the layers of fibrous reinforcing material is on average less than the average particle size of the aggregate whereby the reinforcing material filters the particulate aggregate from the polymer mortar matrix to allow only the resinous material to penetrate said layers.

It will be appreciated that the moulding method allows the manufacture of a composite article having a polymer mortar core loaded with an aggregate, without the need to undertake conventional hand lay-up of the layers making up the two outer skins. By the process of this invention, the fibre reinforcement is placed in the mould by hand, but no resin impregnation is performed at that time. Rather, the resin impregnation occurs at the same time as the core is created, using the same resin, so ensuring homogeneity to the finished product.

The aggregate normally will have a particle size in the range of 0.05 mm to 5 mm and be high-density particulate material, as compared to the resinous material of the polymer mortar matrix. Thus, the aggregate typically may comprise a mineral aggregate or other relatively high-density particulate material with particle densities greater than that of the resinous material contained within the polymer mortar matrix. Typical polyester resins, for example, will have a specific gravity (s.g.) of approximately 1.1. Mineral aggregates may typically have a bulk dry s.g. of between 1.5–1.75 and a particle s.g. of between 2.7–3.4. Coal combustion by-product aggregates, excluding cenospheres and other processed light weight derivative materials, may typically have a bulk dry s.g. of between 0.6–1.1 and have particle s.g. of between 1.6–2.1. Recycled crushed-glass aggregates may typically have bulk dry s.g. of between 1.2–1.6 and particle s.g. of between 2.2–2.9.

For certain applications, it may be advantageous to use an aggregate having a particle size outside the above range, for example to give particular mechanical properties to the polymer mortar matrix. In that case, it may be necessary to use fibre reinforcement having fibres of special sizes or having a modified structure, especially if small particle aggregate is used.

In addition, when aggregate within (or above) the particle size range mentioned above is employed, the polymer mortar matrix may also include a filler. In this case, it is preferred for the average particle size of the fillers to be sufficiently small whereby only the resinous material and small particle fillers penetrate said reinforcing material layers. For example, ceramic fillers could be employed. Instead of, or in addition to, small particle fillers, chopped strands or other fibrous fillers such as micro-fibres may be added to the polymer mortar.

Preferably, the method is performed by withdrawing air from the mould cavity at the same time as the polymer mortar matrix is injected through the injection port into the cavity, between the layers of reinforcement. Withdrawal of air may commence prior to the injection of the polymer mortar, whereby a lower injection pressure may be employed. For example, the injection port may be positioned mid-way between the ends of the mould cavity and air may be withdrawn from the ends of the mould cavity. By reducing the pressure in the cavity and at the same time injecting the resin under pressure, excellent penetration of the reinforcement may be achieved, over the whole of the area thereof. The use of negative pressure also reduces the internal pressure required within the mould cavity to ensure that resinous material is separated from the polymer mortar core and rapidly penetrates the said reinforcing layers. In turn, this allows the use of a faster-curing resin, so reducing the time during which any aggregate drift might occur, leading to a more homogeneous core matrix. Also, there is a reduced cycle time for a production process, leading to lower costs.

Advantageously, the process is performed with an injection pressure of less than 3 bar, coupled with the reduction of pressure in the mould cavity. This gives rise to cost savings in the process tooling as moulds can be designed and manufactured to withstand lower internal pressures than would otherwise be necessary without the use of negative pressure. For example, the moulds could be made from FRP and still have sufficient strength for performance of the process. Cost savings are also derived from the reduction of injection pressure, as lower pressure systems are less costly than those designed to inject materials at higher pressures. A further advantage of the use of negative pressure is that a fully closed injection system can be formed allowing greater control on the emission of volatile substances to the environment.

The injected polymer mortar may comprise any of those resins conventionally used for the manufacture of composite products using FRP. For example, the resin may be selected from the group consisting of epoxy, acrylic, phenol formaldehyde, vinylester and polyester resins, together with an appropriate activator to ensure curing of the resin within a reasonable time scale following injection of the polymer mortar.

The high-density particulate aggregate used to load the polymer mortar preferably is relatively cheap as compared to the cost of the resin system. For example, a mineral aggregate, such as sand, may be employed as may recycled or waste materials, such as coal combustion by-products or crushed recycled glass. Mixing of the polymer mortar with the aggregate, ready for injection, preferably is performed under vacuum, so as to avoid entrapment or entrainment of air in the mortar. Further, environmental pollution may be minimised, by controlling both spillage of resin and escape of vapours to atmosphere.

Both by mixing the polymer mortar under a partial vacuum (i.e. a reduced pressure) and then injecting the polymer mortar whilst drawing air from the mould, the entire process can be conducted under closed conditions, further reducing the likelihood of environmental pollution whilst also giving high quality repeatable products with good homogeneity throughout the polymer mortar matrix.

The selection of a suitable fibre reinforcing material will depend upon the nature of the product to be manufactured and its intended use. Typically, the fibre reinforcing material will comprise at least one of, but possibly mixtures of, glass fibres, synthetic fibres (such as of terylene), natural fibres (such as those derived from jute, hemp or coir) or carbon fibres. That reinforcing material may be of simple uni-directional fibres, together with sufficient further cross-fibres to impart stability to the reinforcing material whilst it is being handled and positioned in the mould cavity, or may comprise more complex matrices of the fibres, such as biased-directional fibre mats, bi-directional mats, woven mats or multi-directional chopped strand mats. In all such cases reinforcing material will be arranged so that gaps between the individual reinforcing fibres will form a mesh through which the resinous material will pass, but not the aggregate, thus allowing resin-impregnation of the reinforcing mat.

The injection port for the injected polymer mortar matrix may project into the cavity from a side wall thereof, so as to ensure the resin is fed into the space between the two layers of reinforcing material previously placed in the cavity. In the alternative, the port may be flush with the inner surface of the mould, and the reinforcement is provided with a suitable opening in the region of the port, to permit the resin to flow between the layers making up the two skins. Further, to ensure that the polymer mortar loaded with the aggregate initially runs between those layers, spacers may be provided between the layers making up the two skins, at least in the vicinity of the injection port, to hold the respective layers apart and ensure injection of the resin into the required space.

In an alternative process, the reinforcing material may lightly be tacked to the side walls of the mould cavity, for example using an adhesive or an adhesive tape, prior to closing of the mould and the injection of the polymer mortar matrix. In this case, there may be no need to include spacers between the layers of reinforcing material.

As with the known manufacturing processes for composite articles, a gel-coat or other outer layer (such as an anti-corrosion layer) may first be deposited on at least one of the surfaces of the mould cavity, prior to the performance of this invention, as discussed above. Such a gel-coat or other outer layer may be designed to provide particular properties to the finished product, such as a barrier layer resistant to the penetration of the composite article by a liquid which may be in contact therewith.

The manufacturing process of this invention is particularly suitable for composite articles having two principal surfaces held spaced apart by a relatively small distance as compared to the dimensions of the principal surfaces. For example, such articles may comprise building panels and cladding. Alternatively, the principal surfaces may be arcuate whereby the moulded article may form a segment of the surface of a pipe so that a plurality of the segments may be assembled together to form a complete pipe of circular, ovoid or other section. Further, the method may be used to mould complete pipe sections or cylindrical products, with appropriately shaped moulds. Such pipes, or pipes made from the moulded pipe segments, may find particular use in the lining of sewers and other underground civil engineering structures such as passageways, conduits, culverts, tunnels and the like.

By way of example only, one specific embodiment of this invention will now be described in detail with reference to the accompanying drawings, in which.

Figure 1:
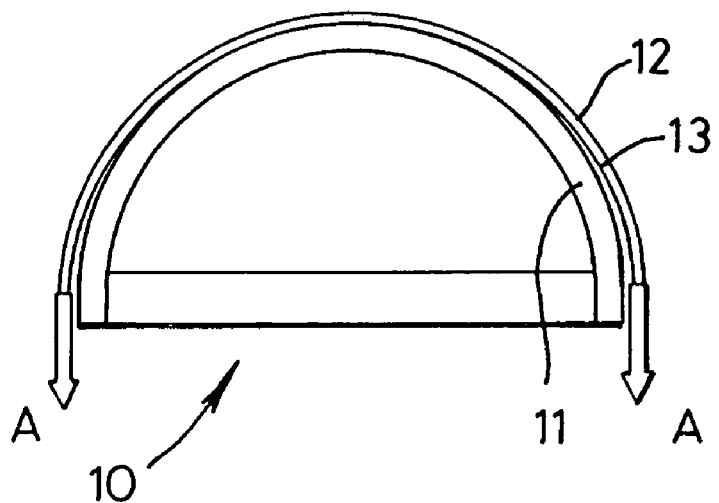
FIG. 1 is an end view on a mould used in the performance of the method.
Figure 2:
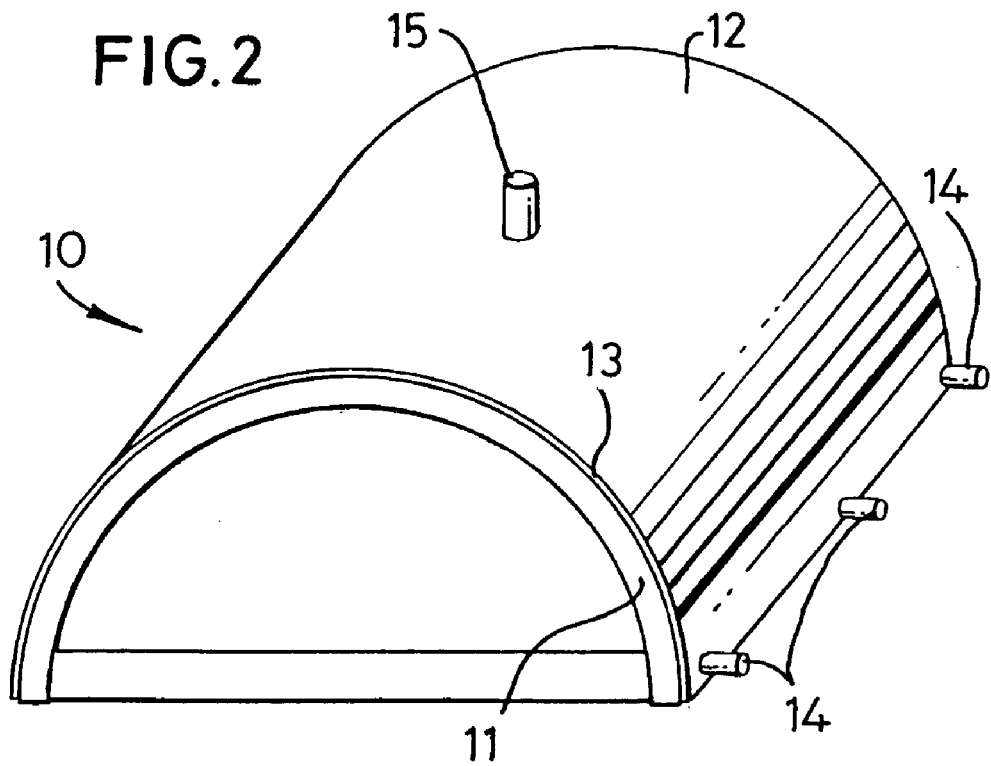
FIG. 2 is a diagrammatic isometric view on the mould of FIG. 1.
Figure 3:
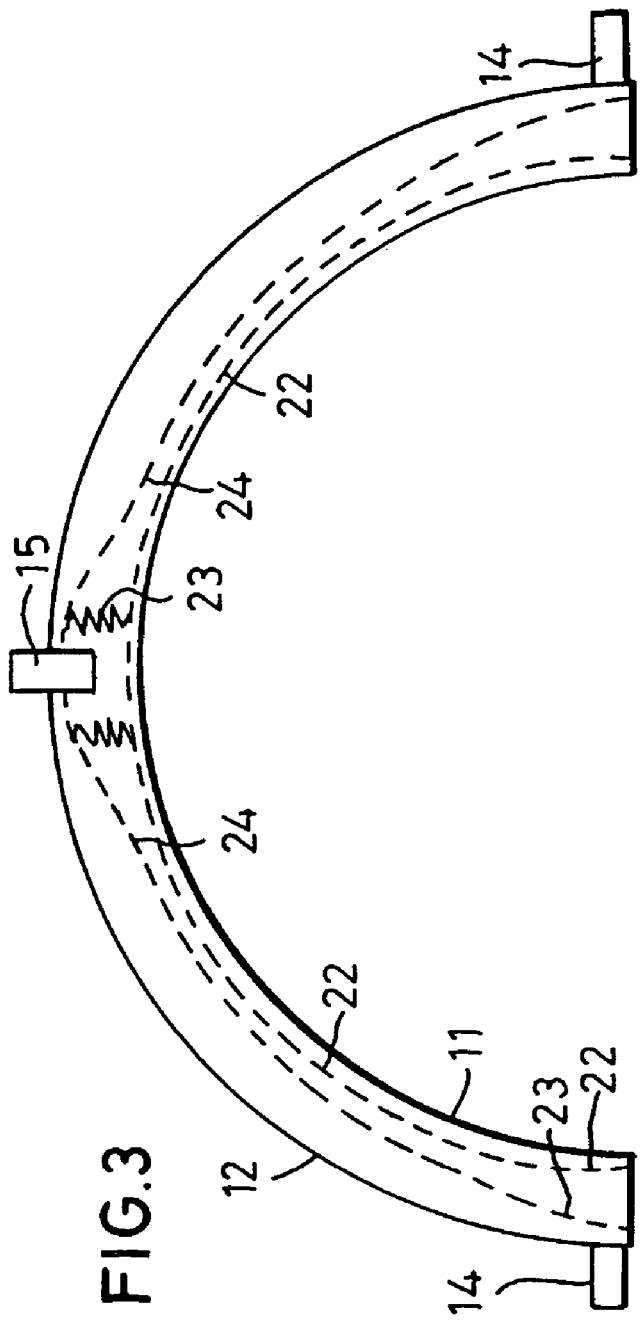
FIG. 3 is a vertical section through the mould.

Referring initially to FIGS. 1 to 3, there is shown a two-part mould 10 having a rigid inner section 11 of arcuate form and a flexible outer section 12 which can be pulled down as shown by arrows A on to the sealing faces 13 of the inner section, so as to form an air-tight mould cavity. The inner section 11 is made from electro-plated mild steel, thus ensuring good durability and a high quality finish, free from flaws and suitable for receiving a gel-coat layer or some other barrier layer. The flexible outer section 12 is made from a stainless steel sheet or mild steel sheet with a suitably thin electro-plated coating to allow flexure without distress or cracking occurring in the coating.

As shown in FIG. 2, the outer section 12 is provided with vacuum ports 14 along both long edges, which ports are connected in use to a low pressure source, so as to draw air out of the mould cavity. Further vacuum ports may be provided as required, for example along the inside mould cavity edges. A polymer mortar resin injection port 15 is provided through the outer section 12, generally in the central region thereof.

Figure 4:
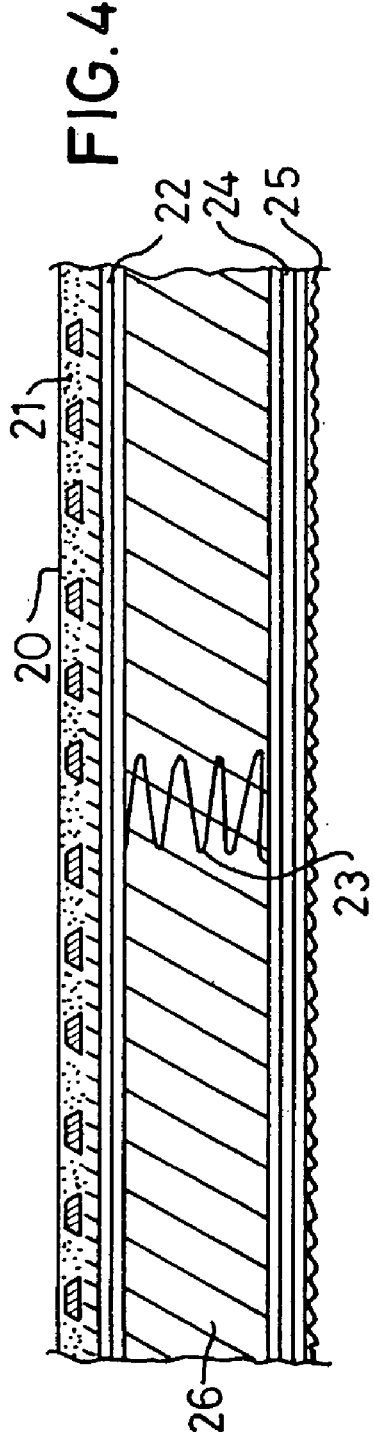
FIG. 4 illustrates a cross-section through a product manufactured by the process.

The arcuate surface of the inner section 11 is coated with a release agent and then a gel-coat or other barrier layer 20 (FIG. 4) is applied over that surface, if such a layer is required. Specially formed anti-corrosion layers 21 can be formed from continuous filament mats, chopped strand mats and glass or synthetic fibre surface tissues to ensure that a resin rich barrier layer will be formed under the barrier layer 20. This may be required if the finished composite article is to be in contact with aqueous fluids or effluents. The thickness and composition of such layers 21 can be adjusted to achieve the required corrosion resistance levels in the finished article.

Next, layers 22 of fibre reinforcement are arranged within the mould so as to impart to the finished product the required mechanical properties. Thus, the arrangement of the fibres in the reinforcement, the density of the fibres and so on, are selected having regard to the intended final product. For example, if a particular strength is required in one direction, as with a pipe or pipe segment where maximum strength is required in the hoop direction, then uni-directional or biased directional fibre matting can be laid in that direction.

Depending upon the intended use for the final product, the fibre reinforcement may comprise mechanically bonded or adhesion bound mats of chopped fibres laid in a random direction, woven uni- or bi-directional mats, continuous filament wound mats, or other suitable fibre reinforcing materials or combinations of the aforesaid materials. In all such cases reinforcing materials have gaps between the individual reinforcing fibres which form a mesh through which the resinous material may pass, to allow impregnation of the reinforcement.

After building up the required layers 20, 21 and 22 against the rigid inner section 11 to form the inner skin, spacers 23 (FIGS. 3 and 4) are positioned on those layers in the central region, around the injection port 15 when the outer section is assembled. These spacers preferably are in the form of open-coil springs, but simple small blocks could be used instead. Then, using the same considerations as have been discussed above with regard to the layers built up against the inner section 11 to form the inner skin, layers 24 of reinforcement material are built up to form the outer skin. Finally, should it be required, another barrier layer 25 may be laid-up over the layers 24.

The mould is closed by pulling the outer section 12 over the inner section so as to achieve an air tight seal. During this, the injection port 15 is arranged to penetrate through the reinforcing layers which will make up the outer skin, a suitable hole being cut through those layers snugly to accommodate the port.

A suitable polymer mortar system is mixed under reduced pressure from a resin and high density particulate aggregate such as sand, together with an activator for curing the resin. Air is withdrawn from the mould cavity through vacuum ports 14 and then the polymer mortar is introduced under pressure through the injection port 15 into the mould, between the reinforcing layers 21, 22 and 24 which will make up the inner and outer skins, whilst air continues to be drawn out of the vacuum ports 14. The resin serves to push the layers 21,22 and 24 outwardly to contact the mould faces, seeping between and wetting the strands of those layers. The proportioning of positive injection pressure and negative drawing pressure can be arranged so as to ensure there is a minimum injection time coupled with the displacement of substantially all air from the mould giving very high penetration and wetting of the reinforcement. Further, the resin may be drawn to the outer extremities of the product while ensuring the mould is not over-pressured. This may be achieved by a computer-controlled or manual valving system (not shown). As a result of the vacuum assisted resin transfer system, there is a reduced cycle time which allows for faster curing of the laminate and negates, to a greater extent, stratification problems that would otherwise be suffered as a result of the settlement of high-density particulate aggregates within the polymer mortar core over a longer curing period.

The average thickness and mesh of the fibrous matting used in building up the reinforcing and anti-corrosion layers to form the two skins and the average mesh of the aggregate should be selected such that the fibrous matting serves as a filter for the aggregate, substantially to prevent the aggregate moving into the reinforcing layers. In this way, only the resin and small particle fillers will be separated from the polymer mortar core and penetrate and wet the reinforcing layers, with the aggregate remaining within the core 26, between the inner and outer reinforcing layers 22 and 24. This allows high fibre/resin ratios to be achieved in those layers, and so excellent mechanical properties, whilst utilising only a relatively low cost core.

A specific example of a pipe segment manufacturing process will now be given. A polymer mortar matrix was prepared from an isophthalic polyester resin having a specific gravity of 1.1 s.g. An aggregate comprising about 45% (by weight) of specially graded-silica sand, with an average particle size of about 0.35 mm was mixed into the resin. The matrix was prepared in a mixing vessel under reduced pressure conditions, to eliminate air entrapment within the matrix, and the air withdrawn from the mixing vessel was collected and cleaned by filtering and scrubbing, prior to discharge to atmosphere.

The pipe segment manufacturing mould had a mould cavity with dimensions of approximately 1500 mm by 1571 mm with a wall separation of 35 mm, the mean radius of curvature of the walls being 1017 mm. After coating the mould cavity with a release agent, a gel-coat was applied to the two principal areas, reinforced chopped strand matting being used to reinforce the gel-coat layers. Two layers of uni-directional glass-reinforced fibre matting were laid within the cavity adjacent one principal area, and a further two such layers adjacent the other principal area, with springs being used to hold the pairs of layers apart in the region of the injection port.

Following closure of the mould, air was withdrawn from the cavity to reduce the pressure therein to about 0.7 bar. Accelerators were added to the matrix immediately prior to commencing the injection step, to give a gel time of 15 minutes and a cure time of about 60 minutes, at an ambient temperature of about 30° C. The prepared polymer mortar was then injected under a pressure of 2.5 bar while continuing to withdraw air from the mould cavity. As with the polymer mortar preparation, the air withdrawn from the mould cavity was collected and cleaned by filtering and scrubbing, prior to discharge to atmosphere The final product removed from the mould had an overall weight of about 157 kg, with a s.g. 1.9. The product had good finishes to its principal surfaces and a relatively high strength. The outer layers showed excellent resin penetration and wetting-out, without the presence of the aggregate in those layers.

The tooling costs required for the performance of the invention are relatively low, in comparison to compression systems. Also, high aggregate levels can be obtained within the polymer mortar matrix, so giving raw material cost savings. Large and in particular thick composite products can be manufactured by the controlled administration of positive injection and negative drawing pressures. The use of a comparatively large quantity of high-density particulate aggregates and fillers assists in the moulding of thicker laminates. This is due to the 'heat-sink' effect provided by the fillers and aggregates which reduces the amount of cracking caused by the exothermic reaction experienced during curing.

In addition, the fibre reinforcement may be selected and arranged so as to optimise the mechanical and corrosion-resistant properties of the finished composite article. This makes the process particularly suitable for the manufacture of ducts, channels, pipes or pipe segments.

Instead of a flexible outer mould section, a rigid outer section could be employed. Other tooling could be used, for example for the manufacture of whole pipe or cylinder sections. Rigid moulds, or mould sections, would permit very good dimensional accuracy to be achieved. Quality control can then be assured and replicated on different production runs. An alternative mould could be made from FRP materials, particularly having regard to the relatively low forces required during the moulding process, especially when air is drawn from the mould simultaneously with the injection of the polymer mortar. Particularly in this case, a suitable release agent must be applied to the surfaces of the mould, to ensure the resin material within the polymer mortar does not itself bond to the mould surfaces.

The invention claimed is:

1. A method of moulding a composite panel to have two opposed outer skins of fibre-reinforced plastics material and a polymer mortar core therebetween, comprising the steps of:
   providing an openable mould having inner and outer mould sections defining a mold cavity having two principally opposed surfaces and an injection port through which a polymer mortar matrix is introduced into the cavity;
   opening the mould and placing within the cavity respective layers of fibre reinforcement adjacent both the principally opposed surfaces, subsequently to form said opposed outer skins;
   closing the mould and injecting polymer mortar matrix through the injection port into the cavity, between the respective layers of fibre reinforcement placed in said cavity adjacent the principally opposed surfaces; and
   applying sufficient pressure to the injected polymer mortar matrix to ensure resin penetration of both of said layers;
   in which method the injected polymer mortar matrix comprises a resinous material loaded with a particulate aggregate the density of which is greater than that of the resinous material contained within the polymer mortar matrix, and the mesh of both of the layers of fibrous reinforcing material is on average less than the average particle size of the aggregate whereby the two layers of the reinforcing material filter the particulate aggregate from the polymer mortar matrix to allow only the resinous material to penetrate said two layers of reinforcing material, thereby to form said composite panel with a polymer mortar core formed between said two skins.

2. A method as claimed in claim 1, wherein the injected polymer mortar matrix comprises a resinous material loaded with a particulate aggregate and particulate fillers the density of which is greater than that of the resinous material contained within the polymer mortar matrix, the average particle size of the fillers being sufficiently small whereby only the resinous material and small particle fillers penetrate said reinforcing material layers.

3. A method as claimed in claim 1, wherein air is withdrawn from the mould cavity at least simultaneously with the injection of polymer mortar therein.

4. A method as claimed in claim 3, wherein the polymer mortar injection pressure and the negative pressure to withdraw air from the mould cavity are controlled together, to optimise the polymer mortar injection and wetting of the reinforcement.

5. A method as claimed in claim 1, wherein the injected polymer mortar matrix includes a resin selected from the group consisting of epoxy, acrylic, phenol formaldehyde, vinylester and polyester resins, together with an appropriate activator.

6. A method as claimed in claim 1, wherein the high-density particulate aggregate used to load the polymer mortar is selected from the group consisting of a granular mineral, a granular coal-combustion by-product, granular recycled crushed glass, and granular metal.

7. A method as claimed in claim 1, wherein the fibre reinforcement comprises fibres of glass, synthetic plastics or carbon, or natural fibres or a mixture of such fibres.

8. A method as claimed in claim 7, wherein the fibre reinforcement primarily comprises uni-directional fibres, together with sufficient further fibres to impart stability to the unidirectional fibres during the handling thereof.

9. A method as claimed in claim 7, wherein the fibre reinforcement is in the form of a mat.

10. A method as claimed in claim 1, wherein spacers are positioned between the respective layers of reinforcing material at least in the vicinity of the injection port to hold apart the layers which will form the inner and outer skins, and to ensure the polymer mortar is injected between said layers.

11. A method as claimed in claim 1, wherein an adhesion system is used to hold the respective layers of reinforcing material in contact with the inner faces of the mould, adhesion system acting between said layers and the walls of the mould cavity.

12. A method as claimed in claim 1, wherein the injection port has an exit orifice located in the mould cavity either flush with the wall of the cavity through which the port opens or upstanding therefrom, to be disposed part-way between opposed internal walls of the cavity.

13. A method as claimed in claim 1, wherein at least one surface of the mould cavity has a gel-coat or barrier layer applied thereto before the placement of the fibre reinforcement.

14. A method as claimed in claim 1, wherein the polymer mortar matrix is prepared in a mixing vessel under reduced pressure by withdrawing air from the mixing vessel, air is withdrawn from the mould cavity at least simultaneously with the injection of polymer mortar therein.

15. A method as claimed in claim 14, wherein the air withdrawn from the mixing vessel and mould cavity is collected and cleaned before discharge to atmosphere.

16. A method as claimed in claim 1, in which said inner and outer mould sections of the openable mould are of arcuate form.

17. A method as claimed in claim 16, wherein said inner and outer opposed mould surfaces are shaped for the manufacture of a whole pipe or cylinder.

* * * * *